United States Patent [19]
Voiturier et al.

[11] 3,935,681
[45] Feb. 3, 1976

[54] FIRE SCREEN FOR A STRUCTURAL PANEL

[75] Inventors: Jean-Pierre Voiturier, Gerpinnes; Francis Jacquemin, Monceau-Sur-Sambre, both of Belgium

[73] Assignee: Glaverbel S.A., Watermael-Boitsfort, Belgium

[22] Filed: Aug. 7, 1974

[21] Appl. No.: 495,513

Related U.S. Application Data

[62] Division of Ser. No. 263,762, June 19, 1972, Pat. No. 3,837,126.

[30] Foreign Application Priority Data

June 18, 1971   Luxemburg............................ 63370

[52] U.S. Cl. .......................... 52/1; 52/168; 52/171; 50/232
[51] Int. Cl............................................... E04b 1/92
[58] Field of Search .......... 109/29, 33, 32; 169/2 R, 169/26; 52/202, 203, 232, 171

[56] References Cited
UNITED STATES PATENTS

| | | | |
|---|---|---|---|
| 843,462 | 2/1907 | Hutchinson............................ | 52/168 |
| 980,443 | 1/1911 | Shuman ................................. | 160/1 |
| 1,369,518 | 2/1921 | Bumbarger ............................ | 160/1 |
| 2,142,164 | 1/1939 | Young .................................... | 52/232 |
| 2,419,400 | 4/1947 | Haven.................................... | 52/172 |
| 3,154,821 | 11/1964 | Weker.................................... | 52/168 |
| 3,460,303 | 8/1969 | Algrain .................................. | 52/616 |
| 3,543,460 | 12/1970 | Stastny.................................. | 52/232 |
| 3,566,564 | 3/1971 | Gaeth .................................... | 52/232 |

*Primary Examiner*—John E. Murtagh
*Attorney, Agent, or Firm*—Edmund M. Jaskiewicz

[57]   ABSTRACT

A structural panel comprising one or a plurality of spaced sheet members has a frame around its edge. At least one body of material capable of screening the structural panel against fire is provided in the form of a chemically activated substance. The substance or substances are retained in an inoperative position in the vicinity of the structural panel and are released to an operative position in response to a predetermined rise of temperature wherein a body of material covers substantially one or more faces of the panel.

20 Claims, 9 Drawing Figures

FIRE SCREEN FOR A STRUCTURAL PANEL

RELATED APPLICATIONS

This application is a division application of the copending application filed by the same named applicants on June 19, 1972 having Ser. No. 263,762, now U.S. Pat. No. 3,837,126, issued Sept. 24, 1974.

The present invention relates to a structural panel having a fire screen, more particularly, to such a fire screen which is provided in the operative protecting position in response to indication of a fire.

In the construction of buildings panels are frequently used in exterior or interior walls which are not resistant to fire. One such example is a glazing panel formed either of glass, vitrocrystalline material, or plastics.

It is frequently necessary that structural components of a building must comply with high standards of fire resistance. Fire resistance may be determined against a standard test in which the structural component is exposed to a specified temperature cycle for a certain duration of time. The fire resistance property of the component will be determined by the length of time for which the component can retain the strength required in order to fulfill its intended function. Under certain circumstances it may be necessary to comply with fire resistance standards which require the component to have a minimum strength retention time, to be completely flame proof, and to comply with other stringent tests of thermal insulating power to ensure that the component will deter spreading of a fire a radiation of heat from the component but will not become so hot as to cause serious risk of burning to a person who may touch the panel while it is exposed to the fire.

The standard of fire resistance of a given component can be quantified as a function of the time for which the component satisfies one or more of the specified criteria during a test in which the component is exposed to the interior of an enclosure in which the temperature is raised according to a predetermined schedule. For example, standards of fire resistance designated 1, 2 and 3 may be established corresponding to resistance times of 15, 30 and 60 minutes respectively in a test in which the temperature of the test enclosure is 720°, 820° and 925°C during that time.

By reason of the materials of which they are composed, light-transmitting panels do not have a very high inherent fire resistance.

It has been proposed to provide buildings with a fire protection system which operates automatically in the event of an outbreak of fire. Thus it has been proposed to provide over the door and window openings of a building, heat-responsive sprinkler heads from which a fire-extinguishing agent is automatically discharged to produce a "veil" or "mist" in front of the window or door openings in the event of a fire.

This known system is designed to assist in extinguishing a fire within or in the vicinity of the building. The system cannot prevent intense heat propagation through the window or door panels or the complete destruction of these panels if the fire persists.

It is therefore the principal object of the present invention to provide a novel and improved fire screen system for a structural panel.

It is another object of the present invention to provide a system which screens a structural panel which is not resistant to fire and which is automatically released to an operative position to render the panel fire resistant.

It is further object of the present invention to provide a fire screen system for a structural panel which is automatically actuated upon a rise in temperature indicative of the presence of fire so as to provide a fire screening body of material to protect the panel from damage and at least from complete destruction.

The objects of the present invention are achieved and the disadvantages of the prior art as described above are eliminated by the fire screening system for a structural panel disclosed as the present invention. According to the present invention a structural panel is provided with a fire screening means which is retained in an inoperative position within or in the vicinity of the panel. A screen releasing or activating component is associated with the fire screening means so as to release or activate the screening means in reponse to a rise in temperature indicative in the presence of fire. Upon activation of the fire screening means there is provided at least one fire screening body of material which substantially covers the area of the panel.

In a one embodiment, the fire screening means in its operative position covers at least one outer face of the structural panel. In most cases it will be sufficient to provide the fire screen over only one side of the panel. The system according to present invention can be used for fire screening any kind of a panel including panels comprising a single sheet number or plurality of spaced sheet numbers.

In its operative position, the fire screening means can also cover both faces of the panel. This may be desirable when the panel is a component of a partition between rooms in either of which a fire may occur and it is desired to contain any such occurrence of fire.

The invention may also be applied to a structural panel comprising two or more spaced sheet numbers so as to define a hollow interior chamber with the fire screening means being operative within the chamber. Such panels might occur in a multiple glazing unit comprising two or more spaced light transmitting sheet members at least one of which is of glass. In such hollow panels, the fire screening means may be operative within the panel and also externally of the panel to cover at least one outer face thereof.

The fire screening means may also comprise a mechanical screening member or members which may be a sheet of fire resistant material such as asbestos. The fire resistant sheet is held in an inoperative position by a release number which yields when its temperature is raised to a certain predetermined value. The release member may comprise a material which melts when a predetermined temperature is reached.

The fire screening means may also comprise a flowable material or materials which when released or activated flow into position to form a fire screening body of material substantially covering the area of the panel. In flowing into the operative position, such materials can make very close contact with the adjacent surface or surfaces of the panel. A system according to the present invention may incorporate screening means comprising a flowable material together with a mechanical screening member as mentioned above.

The flowable material may comprise a liquid which thus inherently has good flow properties. The flowable material may also comprise a liquid with solid particles therein in suspension. The dispersed solid may participate in creating a very effective thermal barrier and/or may confer other advantageous properties on the fire screen. The flowable material may also comprise a material in powder or particular form.

This system has the important advantage, that if a fire occurs on one side of the panel, the space on the other side of the panel becomes positively screened off from the fire by the automatic interposition of a body of fire-screening material. By a suitable choice of this material and of the quantity thereof which comes into operation, very high standards of fire resistance can be achieved. This is not possible with the previously known system described above because a veil or mist of water or other fire extinguishing agent cannot adequately prevent the transmission of heat rays or provide a high degree of thermal insulation. Moreover, is such a veil or mist very likely to drift or to become dispersed so that a reliable barrier effect could not be achieved.

In the event of fire, the system according to the present invention provides a barrier constituted by a body of fire-resistant material which can have sufficiently good thermally insulating properties to preserve the panel, or at least that part of the panel protected by the screen, from serious damage or destruction so that the panel can itself continue to function, if necessary, as a flame and smoke-proof closure or even as a strength member.

The invention may be applied for fire screening panels of various materials. The invention is primarily intended for fire-screening light-transmitting panels, particularly panels composed wholly or predominantly of glass, vitrocrystalline material or plastics.

Other objects and advantages of the present invention will be apparent upon reference to the accompanying description when taken in conjunction with the following drawings, which are examplany, wherein.

Proceeding next to the drawings wherein like reference symbols indicate the same parts throughout the various views a specific embodiment and modifications of the present invention will be described in detail.

Figure 1:
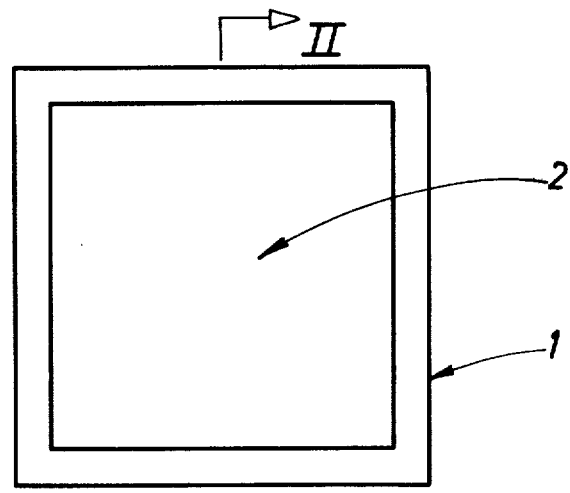
FIG. 1 is a front elevational view of a structural panel incorporating the fire screening means according to the present invention.
Figure 2:
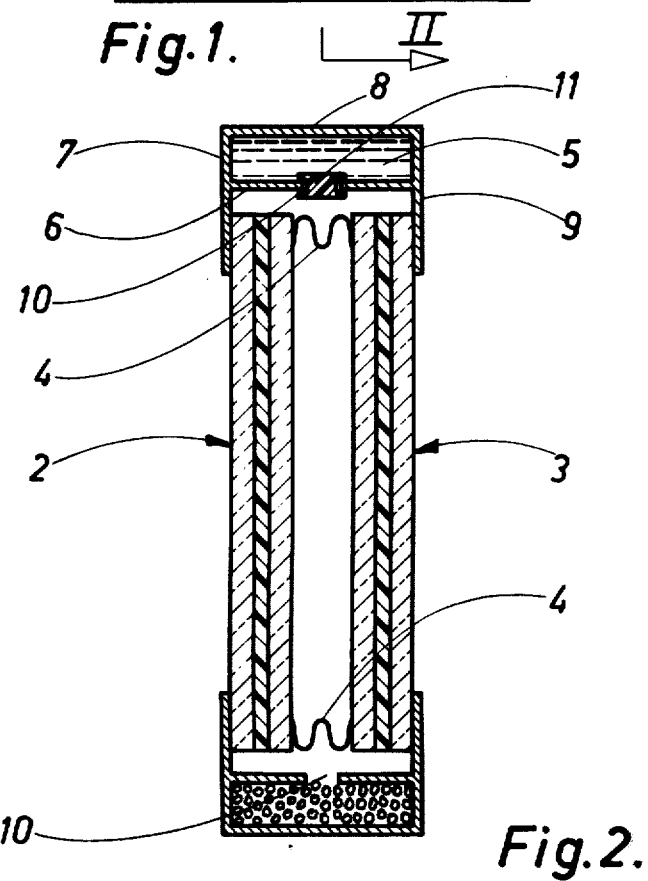
FIG. 2 is a sectional view taken along the line II—II of FIG. 1.

The panel illustrated in FIGS. 1 and 2 is a glazing panel comprising a frame 1 in which two light-transmitting sheets 2, 3 each of a laminated form are held in spaced relationship by elastically compressed spacing members 4 which are disposed in spaced relation around the margins of the sheets and keep the margins of said sheets pressed firmly against inside surfaces of the frame 1. Each of the top bottom and side members of frame 1 is a channel-form member. At least the top and bottom members are formed to provide an interior chamber. Thus, the top frame member comprises an interior chamber 5 and an adjacent open channel, defined by the walls 6, 7, 8 and 9. Apertures 10 are formed in the wall 6. The interior chamber 5 of the top frame member is filled with a hydrated salt, such as sodium silicate, which foams when heated.

Each of the apertures 10 in this frame member is closed by a plug 11 formed of substance having a low melting point. In the present embodiment the plugs are made of wax. At normal ambient temperature the plugs 11 hermetically seal the chamber 5, but as soon as the temperature rises to a given abnormally high value the plugs melt so that the substance in the chamber 5 can flow through the apertures 10 into the interior space between the sheets 2 and 3.

The chamber 5 in the bottom frame member may contain a dessicating material as often used in hollow glazing units, such as silica-gel. In that case the apertures 10 in the wall of such chamber are left unsealed.

Each of the glazing sheets 2, 3 is of laminated form comprising two thin sheets (2 mm) thick of chemically tempered soda-lime glass and an interposed plastic sheet such as polyvinyl chloride. The chemical tempering of the sheets of glass was performed by immersing them in a bath of molten KNO3 at a temperature of 450°C. for several hours.

If fire should break out, the sheet of glass facing the fire is able to withstand the heat to which it is exposed for an appreciable time, 5 minutes for a sheet size of 0.65m × 0.80m, due to the high resistance to thermal shock conferred on the glass sheet by the chemical tempering treatment.

If the sheet should break, the intermediate layer of plastic in the laminate will retain the fragments of glass so that they are not scattered.

As soon as the plugs 11 reach a temperature of the order of 70°C, they melt and allow the liquid in chamber 5 of the top frame member to trickle along the inside faces of the sheets 2 and 3. The interior space between these sheets becomes progressively filled with the liquid. If necessary, the chambers 5 in the side member of the frame may also be filled with hydrated sodium silicate.

Under the action of the heat, the mixture of sodium silicate and water expands to form a liquid foam and the water then evaporates to leave a solid cellular body of a ceramic nature which provides a stable thermal barrier against the fire.

In one particular construction of the panel shown in FIGS. 1 and 2, each of the glazing sheets 2 and 3 was a thin sheet of chemically reinforced glass 0.65m × 0.80m in size, glued together by means of an intermediate layer of polyvinyl chloride. The panel was subjected to a test in which the panel was mounted in the wall of a room in which the mean temperature was raised to 900°C. over a period of 45 minutes.

The outside face of the glass sheet located on the outside of the panel reached a temperature of 280°C, and remained intact.

As alternative to the use of wax for the plugs 11, these may be composed of polyisobutylene-based glue such as "Vistanex", of a mixture of such a glue with wax, or of a metal such as lead, or bismuth, or a lead, antimony or bismuth alloy.

Figures 3, 4:
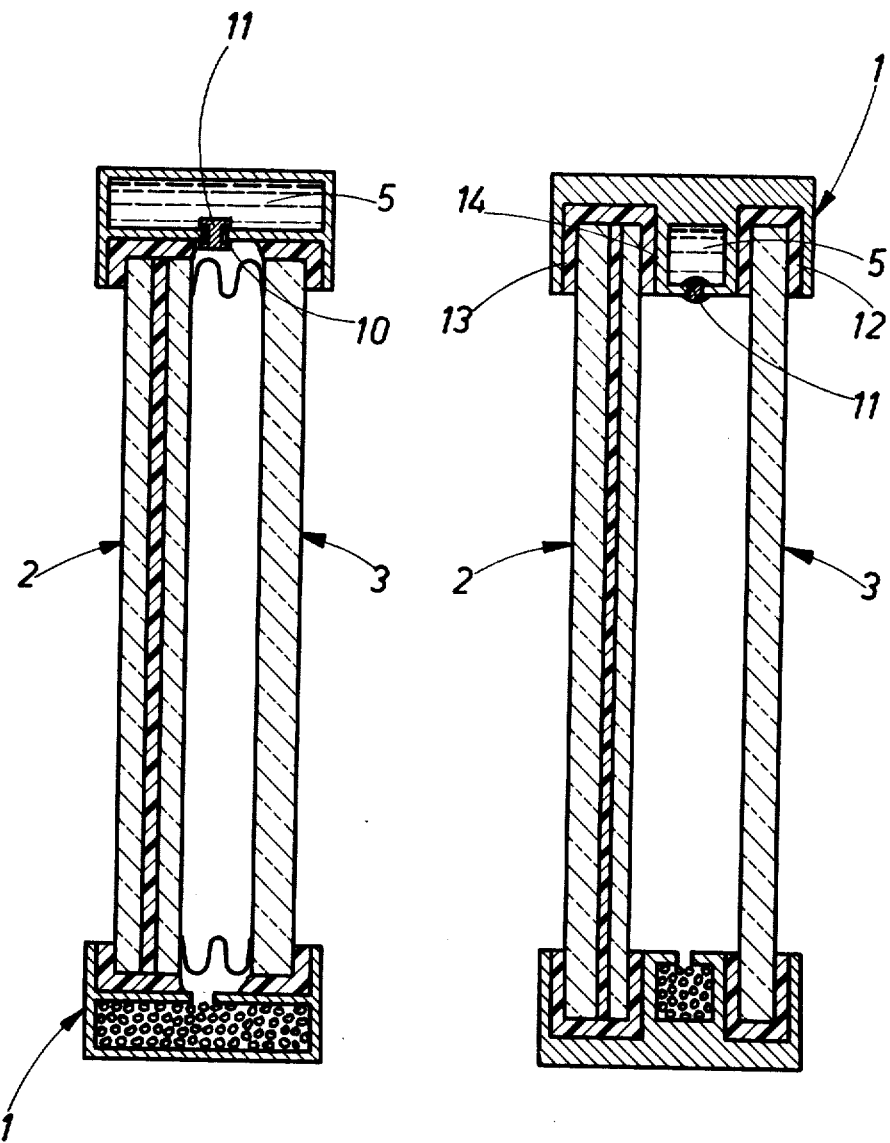
FIGS. 3–6 are sectional views similar to that of FIG. 2 and show modifications of the present invention.

In the panel shown in FIG. 3, the sheet 3 is a sheet of wired glass 7 mm in thickness. The sheet 2 is a laminate of the same kind as the laminate 2 in the panel shown in FIGS. 1 and 2. In the panel shown in FIG. 3, the chamber 5 in the top frame member contains borax. The apertures 10 are closed by plugs 11 composed of a material having a low melting point, such as lead.

In the event of the outbreak of fire, the substance held in the chamber 5 of the top frame member forms a fire-screening body of material within the interior of the panel.

In another embodiment which is not shown, but which is very similar to that illustrated in FIG. 3, the sheet 3 was a sheet of transparent vitrocrystalline material with outstanding fire-resisting properties. Such transparent vitrocrystalline materials can be obtained by heat-treating a glass having the following composition, expressed in percentage by weight: $SiO_2$: 65 –75% $Al_2O_3$: 16–26%; $Li_2O$: 4–5%; $TiO_2$: 4–6%. The heat-treatment is performed to bring about a controlled crystallisation of the glass. The heat treatment can raise the coefficient of thermal expansion to a value of the order of $4.8-5.3 \times 10^{-7}$ cm/°C.

In the panel shown in FIG. 4, the frame 1 has two grooves 12, 13 in which the panels 2, 3 are hermetically sealed by means of an adhesive substance such as "Thiokol". The central portion of the frame, which acts as a spacing member between the panel sheets, is hollow and therefore provides the chamber 5 for holding substances adapted to form a fire-screen. The chamber 5 is filled, for instance, with hydrated silica-gel. The apertures 10 are sealed by plugs composed of a mixture of was and "Vistanex". The interior chamber of the bottom frame member is filled with anhydrous silica gel acting as a dessicating agent to prevent condensation of moisture on the inside faces of the panel sheets 2, 3. Sheet 2 is a laminate similar to the laminate 2 of the panel shown in FIGS. 1 and 2, while panel 3 is a sheet of thermally tempered glass, having a thickness of 6 mm.

Figures 5, 6:
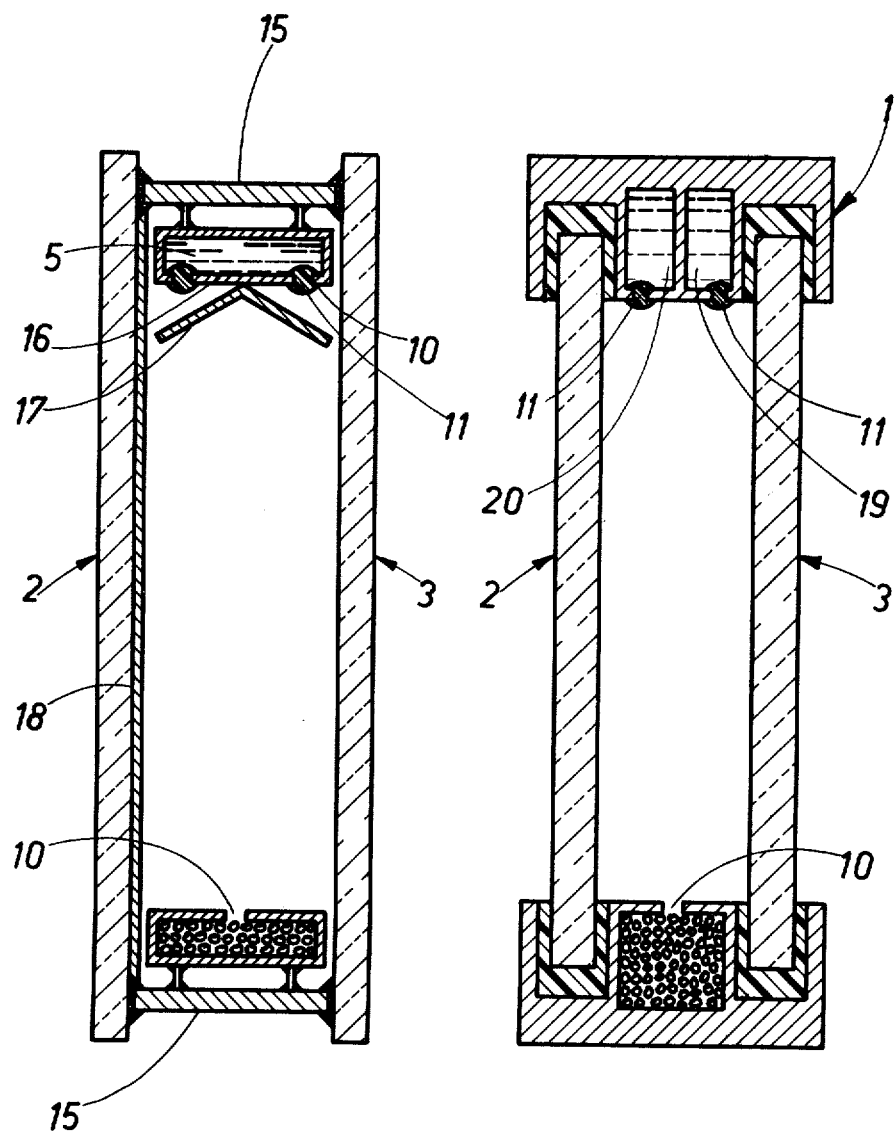

The panel shown in FIG. 5 is a glazing unit. The sheet 2 is a sheet of thermally tempered glass bearing a thin infra-red reflecting coating 18 on its inner face. Sheet 3 is a vitrocrystalline sheet. Sheets 2 and 3 are held in spaced relation by an interposed metal strip 15 which is soldered or welded to the margins of the sheets as known per se. Within the glazing, and suspended from the top portion of the strip 15, there is a container 16 having apertures 10 in its bottom wall. There are two parallel series of such apertures, disposed on opposite sides, of a mid-plane parallel with sheets 2, 3. The container holds a quantity of substance such as hydrated borax. If the plugs 11 composed of low-melting material such as wax melt, the contents of the container are released and trickle over the inside faces of the sheets 2, 3. If required, a deflecting device such as the inverted "V"- section member 17, may be attached to the container 16 to direct the substance from the container onto the inner sheet faces.

Modifications of the present invention may be provided wherein several substances are normally held apart in an inoperative position but upon being released or activated because of the presence of fire become mixed and enter into a chemical reaction to produce a material which flows into the operative position to form the fire screening body of material substantially covering the area of the panel. The formed material may be a foam. The fire screen can thus be formed materials which can be very conveniently accommodated in relatively small chambers in or adjacent to the panel. The substances so contained may include a hydrated material.

The panel shown in FIG. 6 comprises a sheet 2 of chemically tempered glass 4–5 mm in thickness and a sheet 3 of vitrocrystalline material. The panels 2, 3 are held in spaced relation in a frame 1. This frame is similar to the frame 1 in the embodiment illustrated in FIG. 4 but has twin chambers 19, 20 containing different substances. By way of example, the chamber 19 may contain a mixture of the following composition expressed in percentages by weight: sodium, silicate 69%; sodium bicarbonate 7%; water 17%; and soda 7%, and the chamber 20 may contain a mixture comprising, by weight, 59% concentrated phophoric acid, 39% water and a foaming agent, for instance 2% liquid soap. A suitable volume ratio of the two mixtures held in chambers 19 and 20 is 1.2 liters of the first mixture per 0.3 liters of the second mixture.

If the temperature rises sufficiently to melt the plugs 11 the liquids from the chambers 19, 20 trickle along the inner faces of the sheets 2, 3 and mix together in the bottom of the space between these sheets. On coming together, and under the action of the heat to which the panel is exposed, the mixture forms a foam which finally occupies 4–5 times the initial volume of the mixtures. The water evaporates from the foam, leaving a porous cellular solid or substantially solid body of ceramic nature based on silicates, carbonates and phosphates, which forms a very effective thermal barrier.

Other examples of suitable hydrated substances are hydrated compounds and mixtures of hydrated compounds such as sodium silicate, silica-gel, silica-aluminates, ferrous sulfate and carbonates. These hydrated substances can be conveniently held in inoperative position and will form when released or activated in a very good thermal barrier in close contact with the adjacent panel surface. The above listed hydrated materials have the advantage that they do not produce poisonous products when exposed to high temperatures. The close contact of the composition with the face or faces of the panel during the flow of the composition into operative position has the effect of delaying a rise in temperature of the sheet members constituting the panel.

It is not necessary for the materials flowing into the interior chamber of the panel to completely fill the chamber because in these cases it is also possible for the materials to flow along the interior faces of the sheet members defining the space so as to form separate coatings each of which constitutes a body of fire screening materials according to the invention.

The fire screening means may also comprise a substance which upon being heated undergoes a chemical reaction to generate a pressure which causes the fire screening means to become operative. The release may occur by the action of an activating component which is a component of the substance constituting the fire screening means.

Figure 7:
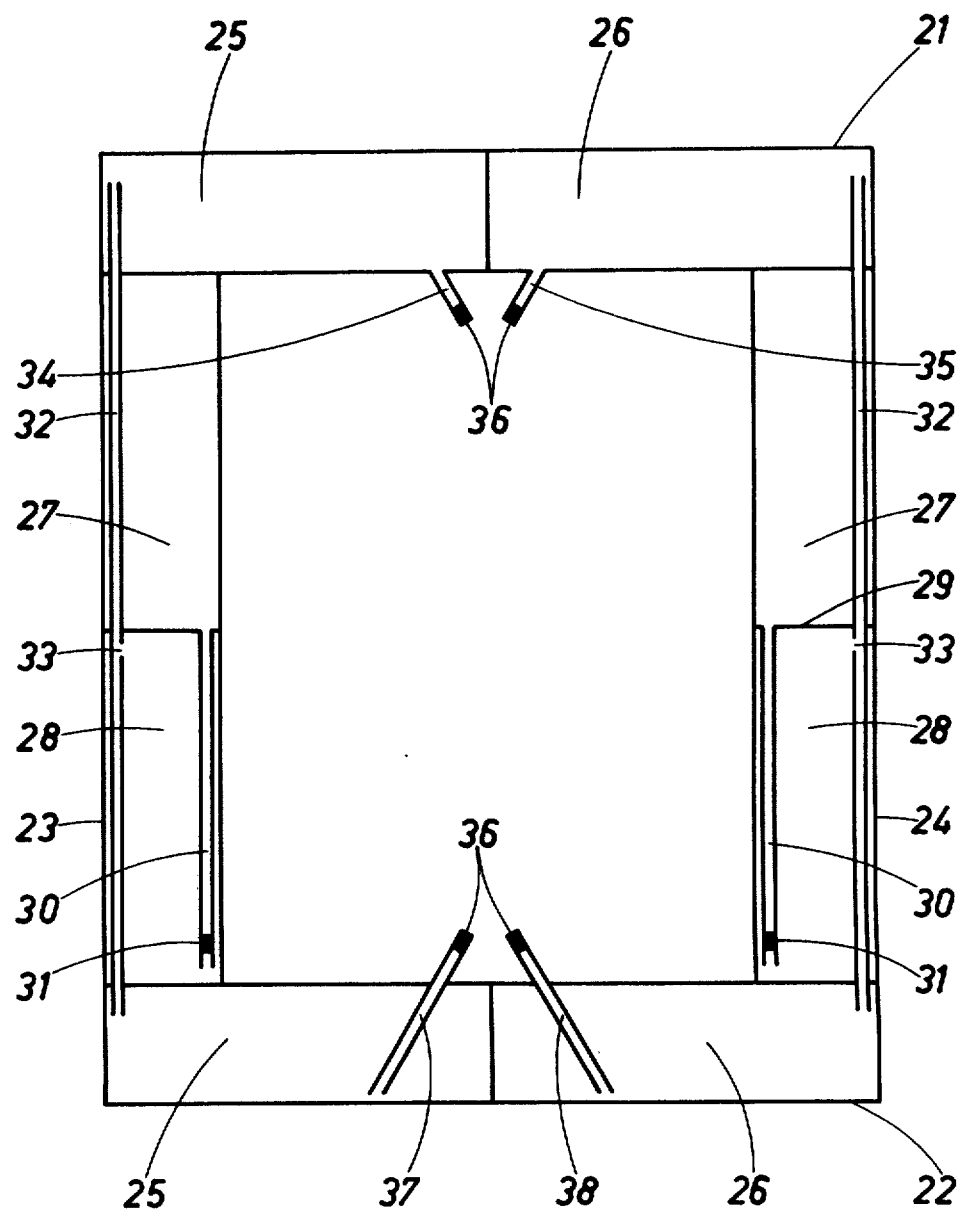
FIG. 7 is a diagrammatic sectional view taken parallel to the faces of a panel and showing a further modification of the invention.

The panel shown in FIG. 7 comprises a frame assembly for holding two panel sheets in spaced relation. The frame assembly comprises top, bottom and side hollow frame members 21, 22, 23, and 24.

Each of the top and bottom hollow frame members 21 and 22 is divided into two compartments 25 and 26. Each of the compartments 25 holds an aqueous solution containing 2 moles of sodium silicate, ¾ of a mole of sodium bicarbonate and 2 moles of caustic soda (NaOH). Each of the compartments 26 holds an aqueous solution containing equal parts by weight of phosphoric acid and RBS 25 or RBS 48, which is a sulphonate foaming agent marketed by Chemical Products of Kerkstraat 16, 1610 Ruisbroech, Belgium.

Each of the side frame members 23 and 24 is divided into two compartments 27 and 28. Each of the compartments 27 holds a dilute aqueous solution of phosphoric acid and each of the compartments 28 holds calcium carbonate. The compartments 27 and 28 of each of the side frame members are separated by a wall 29 but there is an opening in this wall leading into a tube 30 which extends into the compartment 28. In the event of the outbreak of fire causing an abnormally high temperature rise in the panel, acid from the compartment 27 in each side frame member flows along the tube 30 into the compartment 28 containing the calcium carbonate.

Under normal conditions the flow of acid into the compartment 28 is prevented by a wax plug 31 in the end of the tube 30.

Along the sides of the frame assembly there are tubes 32. In the peripheral wall of each of these tubes there is an orifice 33 opening into one of the compartments 28. Thus the left hand tube 32 places the top and bottom compartments 25 into communication with the compartment 28 in the left hand side frame member whereas the right hand tube 32 places the top and bottom compartments 26 into communication with the compartment 28 in the right hand side frame member.

The compartments 25 and 26 in the top frame member are furnished with tubes 34 and 35 closed by rubber plugs 36. The compartments 25 and 26 in the bottom frame member are provided with tubes 37 and 38 which are also closed by rubber plugs 36.

In the event that the panel is exposed to fire, the wax plugs 31 melt and the acid solution contained in the compartments 27 flows into the compartments 28 and reacts with the calcium carbonate in those compartments with consequent evolution of gas which via the tubes 32 gives rise to an increase in pressure in the compartments 25 and 26 in the top and bottom frame members. In consequence, the liquids contained in the said compartments 25 and 26 are subjected to pressure.

When this pressure exceeds a certain value, the rubber plugs 36 are forced out of place and the solution contained in the compartments 25 and 26 in the top and bottom frame members commence to discharge through the tubes 34, 35 and 37, 38. The tubes 34 and 35 are inclined towards one another so as to ensure that the liquids discharging from the top compartments 25 and 26 become mixed together. The bottom tubes 37 and 38 are similarly mutually inclined to ensure mixing of the liquids discharging from the bottom compartments 25 and 26. The mixing of the solutions from compartments 25 and 26 gives rise to the formation of a foam which progressively fills the whole of the space between the spaced sheets of the panel. This foam constitutes a very effective thermal barrier.

In certain cases it is an advantage for the creation of the fire screen to be controlled at a position external to or remote from the structural panel. For example it may be necessary for the fire-screening means to be rendered operative in the event of the outbreak of fire at a given place which is at some distance from the place where the structural panel is installed. A structural panel with a remote control system for the fire-screening means is illustrated in FIG. 8.

Figure 8:
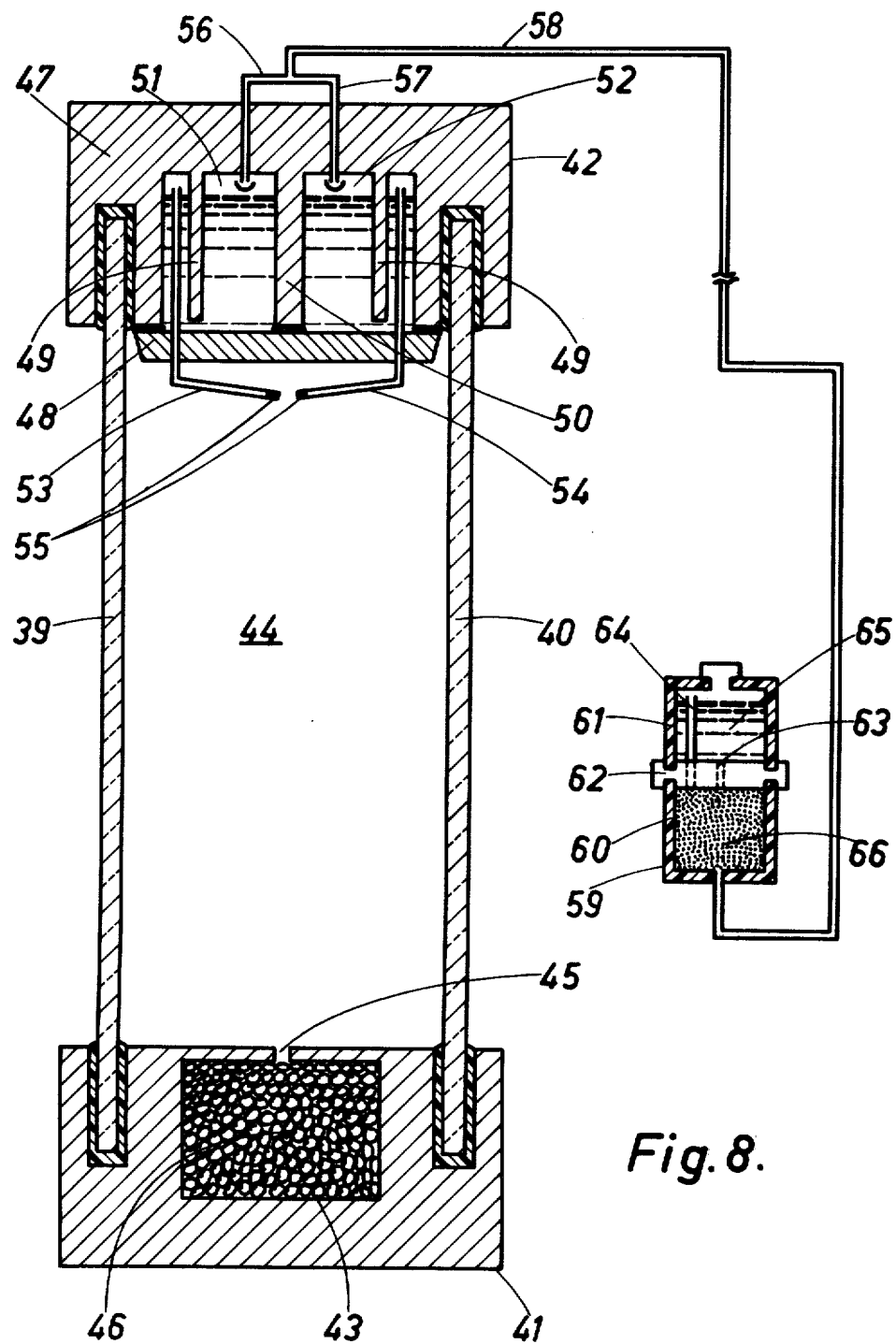
FIG. 8 is a sectional view similar to that of FIG. 2 and showing still another modification.

The panel shown in FIG. 8 comprises two chemically tempered sheets 39 and 40 of ordinary glass, 2 mm in thickness. The sheets 39 and 40 are held in spaced relationship within a metal frame having bottom and top members 41 and 42. Within the bottom frame member 41 there is a chamber 43 which communicates with an interior space 44 of the panel via an aperture 45 in the bottom frame member. The chamber 43 is filled with a dessicating material 46 which is an alumina type molecular sieve.

The top frame member 42 is composed of a channel section component 47 and a bottom plate 48 which is soldered to that component. The component 47 includes vertical flanges 49 which extends along the said component. The component also includes a central thicker flange 50 which divides the space enclosed between the components 47 and the plate 48 into two compartments 51 and 52 into which the flanges 49 extend.

Tubes 53 and 54 extend from the interior of the compartments 51 and 52, at places located outwardly of the flanges 49, through the plate 48, and into the interior space 44 of the panel. The tubes 53 and 54 are closed by rubber plugs 55.

Further tubes 56 and 57 lead from the compartments 51 and 52, through the component 47 and on the outside of the panel are joined to a common conduit 58 so that the compartments 51 and 52 in the top frame member of the panel are in communication with a control device 59 located at a place remote from the panel. This control device comprises two compartments formed by facing containers 60 and 61 formed of polyvinyl chloride and secured to a partition member 62 made of anodised aluminium.

The partition member 62 is pierced by a hole which is plugged with a material 63 having a low melting point, e.g. wax. The compartment 65 of the control device communicates with the compartment 66 via a tube 64 which extends through the partition member 62 and ensures equalisation of the pressures in the compartments.

In the event that the control device 59 becomes exposed to fire, the material 63 which plugs the hole in the partition member 62 melts and an aqueous solution of hydrochloric acid contained in the compartment 65 flows into the compartment 66 which contains calcium carbonate. The hydrochloric acid solution reacts with the calcium carbonate with a resulting evolution of gas which discharges along the conduit 58 and places the compartments 51 and 52 in the top frame member of the panel under pressure.

The compartment 51 contains a solution comprising 2 moles of sodium silicate, ¾ of a mole of sodium bicarbonate and 2 moles of caustic soda (NaOH).

The compartment 52 holds an aqueous solution containing 14 moles of phosphoric acid.

The pressure in the compartments 51 and 52 causes the plugs 55 in the lower ends of the tubes 53 and 54 to be ejected from these tubes and forces the solutions contained in the said compartments 51 and 52 through these tubes and into the interior space 44 between the panel sheets. Due to the mutual inclination of the tubes 53 and 54 the solutions mix together immediately on discharge from the tubes. On being mixed, the solutions react and give rise to the formation of a foam which progressively fills the space 44 and creates a very effective thermal barrier.

In tests performed on panels comprising pressure control systems as described with reference to FIGS. 7 and 8 it has been found that the pressure employed for creating the foam should preferably be of the order of 50 to 100 mm of mercury.

It is therefore apparent that with this modification the fire screening can be rendered operative in response to conditions existing at a location which is not in the immediate vicinity of the panel incorporating the fire screen.

In a modification of the system described with reference to FIG. 8, the compartment 52 can be charged with a solution comprising: four moles of phosphoric acid, 50% by volume of RBS25 and 0.5 moles of aluminium chloride ($AlCl_3$). This solution enables a foam of higher density to be formed and gives rise to the formation of a body of fire-resisting material of ceramic nature.

Figure 9:
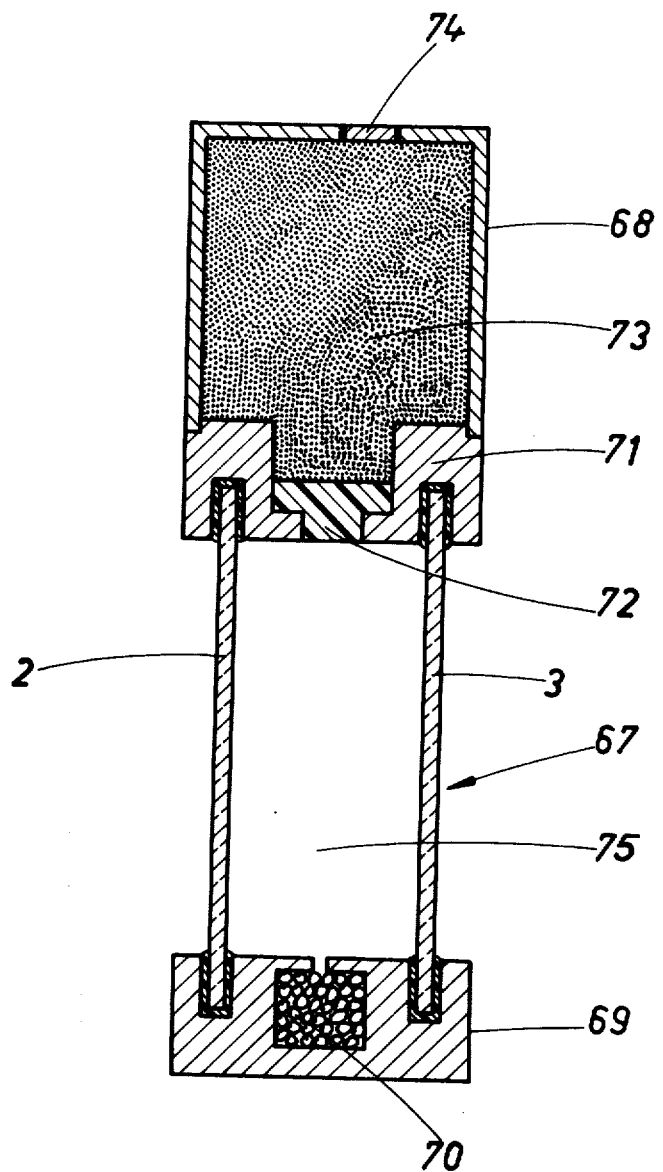
FIG. 9 is sectional view similar to that of FIG. 2 and showing an additional modification.

In FIG. 9, there is shown a glazing unit 67 along the top of which there is a container 68. When the glazing unit is installed in a building or other structure this container is concealed within a part of the wall in which the glazing unit is fitted.

The glazing unit is a double glazing unit comprising two sheets 2, 3, of glass which has been chemically tempered by ion exchange. The sheets are held in spaced relation by a metal frame including a bottom frame member 69 in which there is an interior chamber holding a quantity of dessicating material 70 e.g. anhydrous calcium chloride, and an upper frame member 71 which supports the container 68. The interior of the container 68 is normally sealed off by means of a plug 72 made of low-melting material e.g. wax or a series of such plugs. The container 68 holds a quantity of thermally insulating substance 73, which in this particular embodiment is sand or silico-aluminous granules which is introduced into the container 68 through a top aperture which is subsequently closed by a closure member 74.

In the event that the glazing unit is exposed to fire or a fire hazard, the plug 72 melts and the sand or other material in the container 68 pours down into the space 75, between the glass panes and thus creates a fire screen.

As a modification, the unit of FIG. 9 could be constructed with an electrical resistant heating element within the plug 72, this heating element being connected to a source of electric current located externally of the unit. The electric heating circuit could be controlled by switch means which is automatically actuated on the advent of fire, such switch means being located at a strategic position. Should the electric control system fail, the fire-screening means will still become operative when the temperature of the glszing unit rises sufficiently for the plug 72 to melt.

According to another modification, the quantity of sand 73 was replaced by a solid plate of thermally insulating and/or refractory material which is supported against gravity by a fusible support 72 so that the plate falls into position between the glass panes when that support melts.

According to a further modification, a solid fire-screening plate is used but is supported externally of the unit so that when released the plate falls down in front of the glazing unit instead of between the glazing unit panes.

Instead of filling the container 68 with sand or another discrete solid material, this container could be filled with an appropriate liquid. Such a liquid can contain any required chemical compounds or be otherwise composed in order to provide a good resistance to the transmission of heat rays.

While reference has in particular been made to double glazing units it will be understood that the invention is applicable to the fire-screening of multiple glazing units, e.g. triple glazing units or quadruple glazing units. The invention can also be applied to the fire-screening of panels comprising a single sheet, e.g. by providing fire-screening means in the form of a solid sheet which on the advent of fire descends into operative position in front of the said sheet.

Any of the embodiments of the invention as described can be modified by substituting different materials from those referred to without departing from the scope of the invention.

The invention can be applied to the fire-screening of panels comprising one or more sheets of glass which may be thermally or chemically tempered, or comprising one or more sheets of vitrocrystalline, vitroceramic, or ceramic material.

The invention can also be applied to the fire-screening of panels in which the sheet or sheets is or are of one or more other materials.

In the case of panels comprising a frame, this may be made of any suitable material. However preference is given to frames made of iron, copper, aluminium and alloys of such metals.

When employing a liquid which flows into position to create the fire screen, it is of interest to use a liquid which has the property of wetting and adhering to the adjacent sheet or sheets of the panel but which does not flow freely, even under the effect of high temperature. The adherence to the sheet can be promoted by virtue of a partial or total solidification of the material, e.g. as a result of chemical transformation.

In all embodiments of the invention it is preferable for the system to incorporate fire-screening means located along an upper edge or marginal portion of the panel so that on being activated or released the fire-screening means moves into its operative position under or with the aid of gravity. The advantage of this arrangement is that gravity does not have to be overcome in order to give an all-over coverage of the panel area. In any case it is preferred for the screening means to be localised along at least one edge or margin of panel in order to facilitate the construction and installation of the panel.

The fire-screening system can advantageously be combined with a hollow panel comprising sheets which are held in spaced relation in a frame which serves to promote mechanical strength both in normal service and in the event that the unit is exposed to fire.

When applyng a system according to the invention to a hollow panel, the system preferably comprises fire-screening means which is contained in a chamber or chambers in or structurally united with a frame holding the panel sheets. In such circumstances the hollow panel and fire-screening system can be conveniently transported and installed as a single unit.

It is apparent that in one embodiment of the invention the fire-screening system is combined with a hollow panel comprising sheets which are held in spaced relation by a resilient spacing member or members. Such spacing member or members can serve to press the sheets into direct or indirect contact with a frame holding the sheets. By means of such a resilient spacing means, mechanical strength is promoted, as well as the effective sealing of the panel sheets in the frame, and the resilient spacing means can yield to allow some deformation of the panel sheets under the action of heat.

Advantageously a system according to the invention is combined with a hollow glazing panel comprising at least one sheet the external layers of which are under compressive stress. Such sheet or sheets may for example be a sheet or sheets of thermally tempered glass. Preferably the panel includes at least one sheet of chemically tempered glass, i.e., a sheet of glass in which compressive surface stresses have been introduced by chemical action and notably by an ion exchange between the glass in the external layers of the sheet, and a contacting medium. Usually the ion exchange involved in chemical tempering comprises an exchange of alkali metal ions. In particular such an ion exchange can advantageously comprise an exchange of sodium ions in the glass for potassium or lithium ions contained in a contacting medium. It is an advantage of using a chemical tempering technique that the sheet glass can be thin, e.g., 4 mm or less in thickness. The use of thin tempered sheet glass in the construction of hollow glazing units is of course an advantage in that the unit can be given a high resistance to thermal shock while being of favourably low dimensions and weight.

The invention includes embodiments in which the fire-screening system is combined with a light-transmitting panel comprising at least one sheet which is a laminate comprising at least two thinner sheets directly or indirectly united in face to face relationship. For example, such a laminate may comprise two sheets of chemically tempered glass united by means of an interposed plastics sheet. In such an embodiment the laminate itself provides a number of thermal barriers inhibiting flame propagation and the laminate-sheet has a high mechanical strength because if the outer sheet which is exposed to the fire should break the fragments of this sheet are retained by means of the interposed plastics sheet.

It will be understood that this invention is susceptible to modification in order to adapt it to different usages and conditions, and accordingly, it is desired to comprehend such modifications within this invention as may fall within the scope of appended claims.

What is claimed is:

1. A fire screen for a light transmitting structural panel comprising means for providing at least one body of material capable of screening a structural panel against fire, means for retaining said fire screening means in an inoperative position in the vicinity of the periphery of the structural panel, and means responsive to a rise to a predetermined temperature for releasing said fire screeing means from its inoperative position into an operative position in which at least one fire screening body of material covers substantially the area of the panel, said fire screening means comprising a plurality of substances disposed apart from each other in the inoperative position.

2. A fire screen as claimed in claim 1 wherein said substances mix together upon release of the fire screening means and react chemically to form said fire screening body of material.

3. A fire screen as claimed in claim 1 wherein said substances include a foaming agent whereby in the operative position said fire screening body of material will comprise a foam.

4. A fire screen as claimed in claim 1 wherein one of said substances is a flowable material which when released forms said fire screening body of material, said releasing means yields in response to an increase in temperature to a predetermined value.

5. A fire screen as claimed in claim 1 wherein one of said substances which when heated will undergo a chemical reaction to generate a pressure to release said fire screening means to its operative position.

6. A fire screen as claimed in claim 1 wherein one of said substances is responsive to a predetermined pressure to release said fire screening means to form said fire screening body of material, said temperature responsive release means retaining a quantity of gas under pressure and yieldable at a rise in temperature to a predetermined value.

7. A fire screen as claimed in claim 6 wherein said quantity of gas is retained remote from said panel.

8. A fire screen as claimed in claim 1 wherein one of said substances is responsive to a predetermined pressure to release said fire screening means to form said fire screening body of material, and means responsive to being heated to a predetermined temperature for generating a gas to release said fire screening means.

9. A fire screen as claimed in claim 8 wherein said gas generating means is disposed remote from said panel.

10. A fire screen as claimed in claim 1 wherein said fire screening means is disposed on an upper edge of the panel.

11. A fire screen as claimed in claim 3 wherein the foam is formed upon release of the fire screening means.

12. A fire screen as claimed in claim 1 wherein said structural panel is hollow, said fire screening means being released to an operative position within the panel.

13. A fire screen as claimed in claim 4 wherein said flowable material is a liquid.

14. A fire screen as claimed in claim 1 wherein said fire screening means comprises a hydrated material containing absorbed water and becomes flowable when heated, said hydrated material is one selected from the group of sodium silicate, silica-gel, borax, silica aluminate, a ferrous sulphate or a ferrous carbonate.

15. A fire screen as claimed in claim 1 wherein said fire screening means comprises a hydrated material containing absorbed water and becomes flowable when heated, the liquid ingredient of the hydrated material will evaporate after the fire screening means has been released to its operative position to leave a substantially solid fire screeing body of material.

16. A fire screen as claimed in claim 4 wherein said panel is hollow, said fire screening material flowing into and filling the panel upon being released.

17. A fire screen as claimed in claim 1 and comprising a frame enclosing said panel, means within said frame for defining a chamber therein, said fire screening means being contained in said chamber.

18. A fire screen as claimed in claim 1 wherein said panel comprises a plurality of spaced sheet members, and resilient spacer means for retaining said sheet members in spaced relation.

19. A fire screen as claimed in claim 1 wherein said panel comprises at least one sheet of chemicially tempered glass.

20. A fire screen as claimed in claim 1 wherein said panel comprises at least one laminated sheet, said laminates sheet comprising a plurality of sheets of chemically tempered glass and a layer of plastic therebetween uniting said glass sheets.

* * * * *